United States Patent
Fornos Martinez et al.

(10) Patent No.: US 12,496,781 B2
(45) Date of Patent: Dec. 16, 2025

(54) DETERMINING THAT PRINTING A 3D OBJECT FROM A SELECTED BUILD MATERIAL IS EXPECTED TO RESULT IN A DEFECT

(71) Applicant: Peridot Print LLC, Palo Alto, CA (US)

(72) Inventors: Pol Fornos Martinez, Sant Cugat del Valles (ES); Gabrielle Newman, Sant Cugat del Valles (ES); Maria de las Mercedes Blanco Rollan, Sant Cugat del Valles (ES); Ali Emamjomeh, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 353 days.

(21) Appl. No.: 18/012,037

(22) PCT Filed: Jul. 1, 2020

(86) PCT No.: PCT/US2020/040424
§ 371 (c)(1),
(2) Date: Dec. 21, 2022

(87) PCT Pub. No.: WO2022/005466
PCT Pub. Date: Jan. 6, 2022

(65) Prior Publication Data
US 2023/0234295 A1    Jul. 27, 2023

(51) Int. Cl.
*B29C 64/393*    (2017.01)
*B33Y 50/02*    (2015.01)

(52) U.S. Cl.
CPC ............. *B29C 64/393* (2017.08); *B33Y 50/02* (2014.12)

(58) Field of Classification Search
CPC .................................................... B29C 64/393
See application file for complete search history.

(56) References Cited

U.S. PATENT DOCUMENTS

| | | | |
|---|---|---|---|
| 4,893,260 A * | 1/1990 | Arakawa | G06T 17/10 |
| | | | 702/156 |
| 8,406,567 B2 | 3/2013 | Pizlo et al. | |
| 8,706,283 B2 | 4/2014 | Wang et al. | |
| 9,324,185 B2 | 4/2016 | Schreckenberg | |
| 10,474,134 B2 | 11/2019 | Huang et al. | |
| 10,528,033 B2 | 1/2020 | Morovic et al. | |

(Continued)

FOREIGN PATENT DOCUMENTS

| | | |
|---|---|---|
| CN | 109389596 A | 2/2019 |
| WO | 2017/072536 A1 | 5/2017 |

(Continued)

*Primary Examiner* — Suresh Suryawanshi
(74) *Attorney, Agent, or Firm* — Michael Dryja

(57) ABSTRACT

A method includes receiving an object model describing a geometry of a three-dimensional, 3D, object for printing by a 3D printer, and build material data indicating a selected build material to be used in printing the 3D object by the 3D printer. A volume to surface area ratio of the object model is calculated. In response to the volume to surface area ratio being greater than a first predetermined threshold value for the selected build material, it is determined that printing the 3D object by the 3D printer from the selected build material is expected to result in a defect in the 3D object.

20 Claims, 8 Drawing Sheets

(56) References Cited

U.S. PATENT DOCUMENTS

| | | | |
|---|---|---|---|
| 2017/0368753 A1 | 12/2017 | Yang et al. | |
| 2018/0259939 A1* | 9/2018 | Garcia | B29C 64/393 |
| 2018/0264735 A1* | 9/2018 | Vilajosana | B29C 64/165 |
| 2019/0143412 A1 | 5/2019 | Buller et al. | |
| 2019/0160755 A1 | 5/2019 | Blasco et al. | |
| 2019/0179288 A1 | 6/2019 | Wike et al. | |
| 2021/0276265 A1* | 9/2021 | Mosher | B33Y 50/02 |

FOREIGN PATENT DOCUMENTS

| | | | |
|---|---|---|---|
| WO | 2018/140034 A1 | 8/2018 | |
| WO | 2019/108288 A1 | 6/2019 | |
| WO | 2019/236100 A1 | 12/2019 | |
| WO | WO-2020076285 A1 * | 4/2020 | B22F 10/20 |
| WO | WO-2020153964 A1 * | 7/2020 | B22F 10/80 |
| WO | WO-2020222786 A1 * | 11/2020 | B29C 64/386 |

\* cited by examiner ns by the 3D
DETERMINING THAT PRINTING A 3D OBJECT FROM A SELECTED BUILD MATERIAL IS EXPECTED TO RESULT IN A DEFECT

BACKGROUND

A three-dimensional (3D) printer may generate a 3D object in a build chamber by forming a plurality of successive layers of a powdered or granular build material and selectively solidifying portions of each layer. In one technique each formed layer may have an energy absorbing fusing agent selectively applied to locations within the layer, based on a received 3D object model. Energy is then applied generally to the whole layer, and those portions of the layer where fusing agent was applied heat up sufficiently to melt and fuse to form, upon cooling and solidification, a layer of the object being generated.

In some techniques, the build chamber takes the form of an open-topped container comprising a movable build platform. A build material distributor in the form of a first movable carriage may pass over the chamber in a substantially horizontal direction whilst distributing the build material in a uniform layer. The movable carriage may comprise a recoater, such as a roller or a blade, which may push the volume of build material over the build platform to form a uniform layer of build material thereon. A print head, which may also be mounted on the carriage, may also pass over the build chamber, applying the fusing agent. After the application of energy, the build platform descends by the depth of a layer and the process is repeated until all the desired layers are formed.

DETAILED DESCRIPTION

Examples of the present disclosure relate to a method comprising: receiving an object model describing a geometry of a three-dimensional, 3D, object for printing by a 3D printer; receiving build material data indicating a selected build material to be used in printing the 3D object by the 3D printer; calculating a volume to surface area ratio of the object model; and in response to the volume to surface area ratio being greater than a first predetermined threshold value for the selected build material, determining that printing the 3D object by the 3D printer from the selected build material is expected to result in a defect.

The inventors have discovered that printing objects with a high volume to surface area ratio results in surface defects for some build materials. In particular, a defect may arise as a result of the edges of a printed object expanding upwardly in the build chamber during printing. This upward expansion can cause the printed object to protrude from the open top of the build chamber, resulting in a collision between the printed object and elements of the 3D printer that move across the top of the build chamber. This upward expansion can also modify the intended geometry of the object. Therefore, calculating the volume to surface area of the object from the object model may allow identification of an object that is likely to be defective before it is printed.

Figure 1:
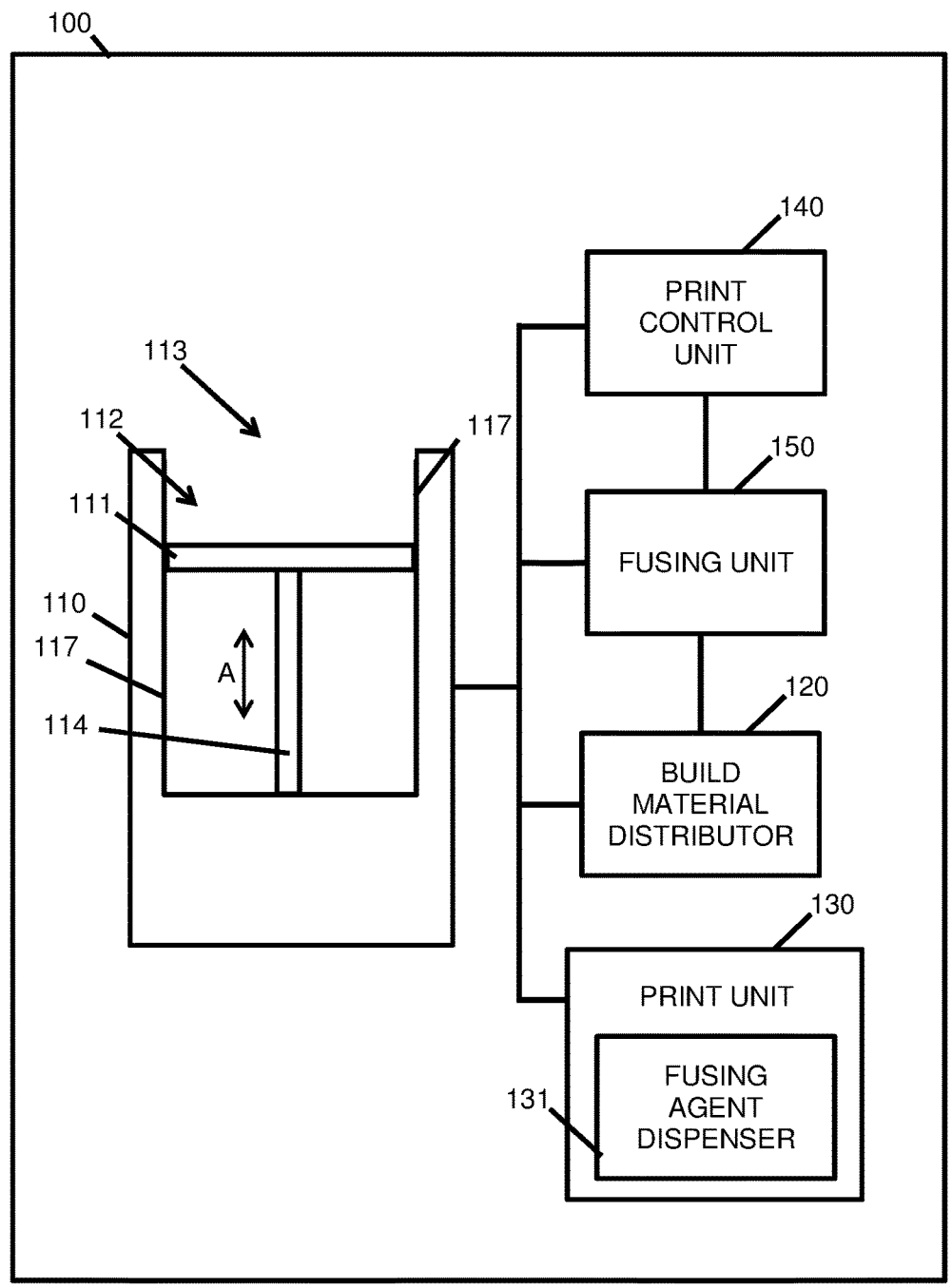
FIG. 1 is a schematic block diagram of an example 3D printer.

FIG. 1 shows an example 3D printer 100, which may be used to form a 3D object. The 3D printer 100 may comprise a build material distributor 120, a print unit 130, a print control unit 140, and a fusing unit 150. The 3D printer 100 may receive a build unit 110. The build unit 110, which is shown in schematic cross-section in FIG. 1, may be a modular unit insertable into the 3D printer 100. However, in other examples, the build unit 110 may be integral to the 3D printer 100.

The build unit 110 comprises a build chamber, generally indicated by the reference number 112, in which the formation of a 3D object takes place. In one example, the build chamber 112 is a substantially cuboid volume defined in the interior of the build unit 110. The build chamber 112 may have an open top end 113.

The build chamber 112 comprises a movable build platform 111, which may be movable in a substantially vertical direction, as indicated by arrow A. The movable platform 111 may support a plurality of layers of build material within which the 3D object is produced. The moveable platform 111 may form a bottom of the build chamber 112 and is sealed around its edges to the sidewalls 117.

The build unit 110 comprises an actuation mechanism 114 to translate the platform. In one example, the actuation mechanism comprises a drive screw. In further examples, the actuation mechanism 14 may comprise a scissor jack, a piston or any other suitable actuator.

The build material distributor 120 delivers build material to the build chamber 112. The build material distributor 120 may be to deliver a layer of build material to the build chamber 112. For example, the build material distributor 120 may comprise a movable carriage to move over the top 113 of the build chamber 112 in a substantially horizontal direction whilst distributing the build material. The build material distributor 120 may distribute the build material in a uniform layer. For example, the movable carriage may comprise a recoater, such as a roller or a blade, to smooth the surface of the build material and ensure the layer deposited is uniform during deposition.

The print unit 130 is to selectively apply print agent to locations of a layer of the build material. The print unit 130 may comprise a fusing agent dispenser 131, to selectively apply fusing agent to a plurality of fusing agent locations. The fusing agent locations may define which portions of the layer of the build material should be solidified to form a layer of the 3D object. In other examples, the print unit 130 may additionally dispense other print agents, such as a detailing agent. The print unit 130 may be mounted on a movable carriage, which moves over the top 113 of the build chamber 112.

The fusing unit 150 is to apply energy to a layer of build material. This causes heating of the build material in the location of the fusing agent, so as to cause the material to heat up and coalesce. Upon cooling, the build material forms a layer of the 3D object. The energy may be heat energy. In some examples, the fusing unit 150 may cause evaporation of the detailing agent. In one example, the fusing unit 150 is mounted on a movable carriage. In some examples, two of the build material distributor 120, print unit 130 and fusing unit 150 are mounted on the same movable carriage. In some examples, all three of the build material distributor 120, print unit 130 and fusing unit 150 are mounted on the same movable carriage.

In general use, the print control unit 140 controls the build material distributor 120, print unit 130 and fusing unit 150 to deliver a layer of build material to the build chamber 112, apply print agent to the layer of build material, and then apply energy to form a layer of the 3D object. The platform 111 is then lowered, for example by the depth of a layer, and the process is then repeated until all desired layers have been formed.

During printing, a defect may arise in which the printed object expands upwardly in the build chamber 112. The defect may occur at the edges of the printed object. This upward expansion can cause the printed object to protrude from the open top 113 of the build chamber 112. This in turn may result in a collision between the printed object and elements of the 3D printer 110 that move across the top of the build chamber 112, such as the build material distributor 120 or recoater thereof. Accordingly, damage may be caused to the printed object, the elements of 3D printer 100 or both.

This may be caused by a temperature difference between the object and the deposited layer of build material, such as in the region of relatively cool object edges. Build materials exhibiting this behaviour may have a relatively high dependence of viscosity on temperature. Build materials exhibiting this behaviour may also exhibit relatively high shrinkage.

Figure 2:
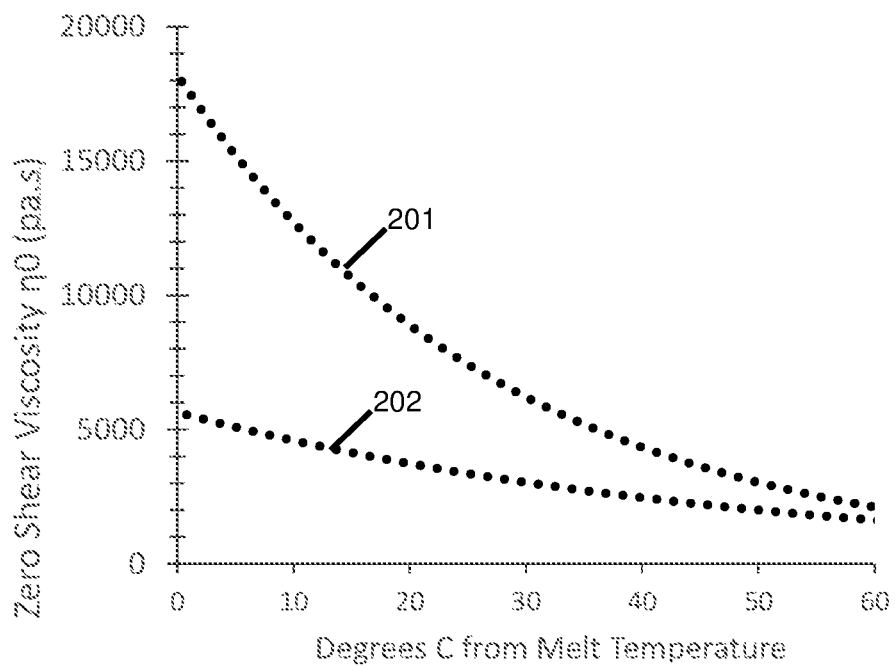
FIG. 2 is a graph illustrating zero shear viscosity of build materials.

FIG. 2 shows the zero shear viscosity of a first material 201 and a second material 202 on cooling. The experiments were carried out using a rotational rheometer, specifically the ARES-G2 supplied by TA Instruments™. A low shear rate sweep was carried out, from which the zero shear viscosity was extrapolated. The first material exhibits high viscosity at melt temperature, and the viscosity rapidly declines as the first material cools. This may make the first material susceptible to the upward expansion defect. The second material has a lower viscosity at melt temperature, and the viscosity declines less rapidly as the second material cools. The second material may therefore be less susceptible to the upward expansion defect.

Figure 3:
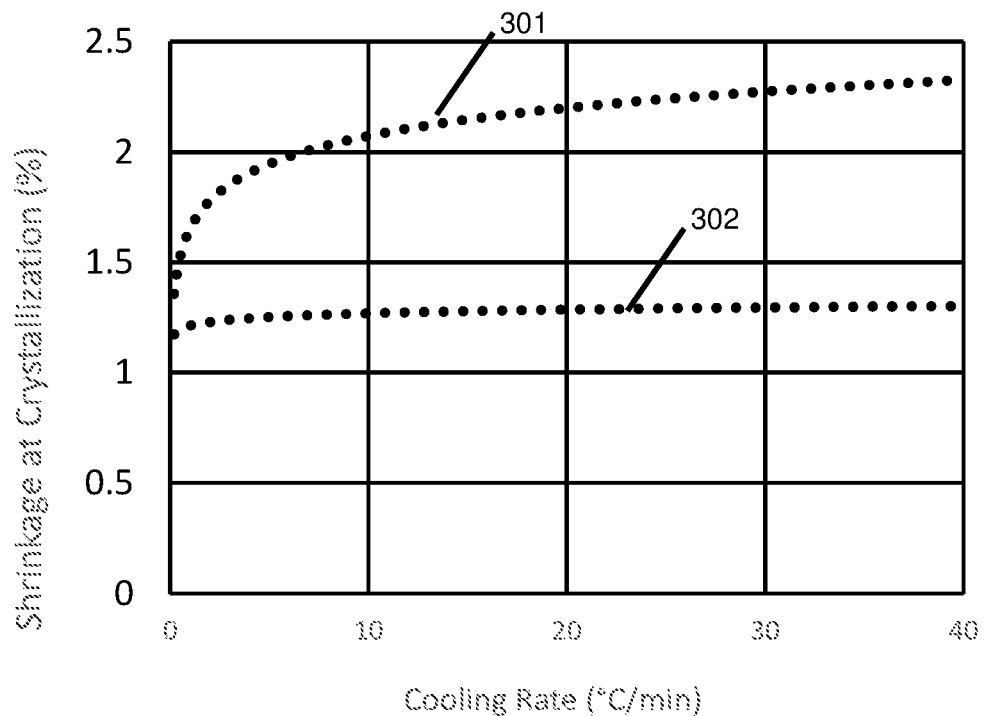
FIG. 3 is a graph illustrating shrinkage percentage of build materials.

FIG. 3 shows the shrinkage percentage at crystallisation of the first material 301 and the second material 302. The experiments were carried out using a thermomechanical analyser, specifically the Q400 TMA supplied by TA Instruments®. The first material exhibits a higher shrinkage rate, which increases if the cooling rate is accelerated. This may also make the first material susceptible to the upward expansion defect. The second material exhibits a lower shrinkage rate, and is less affected by an accelerated cooling rate.

In the examples of FIGS. 2 and 3, the first material is the commercially-available Ultrasint® PP provided by BASF 3D Printing Solutions GmbH, which is a build material comprising polypropylene. However, other build materials comprising polypropylene may exhibit similar behaviour. Other build materials with similar properties as those discussed above may also exhibit similar behaviour. Accordingly, the disclosure herein is not limited to the aforementioned material, which is instead merely an example of a material having the relevant behaviours. The second material is the commercially available PA-12 distributed by HP Development Company LP, which is a build material comprising polyamide.

Figure 4:
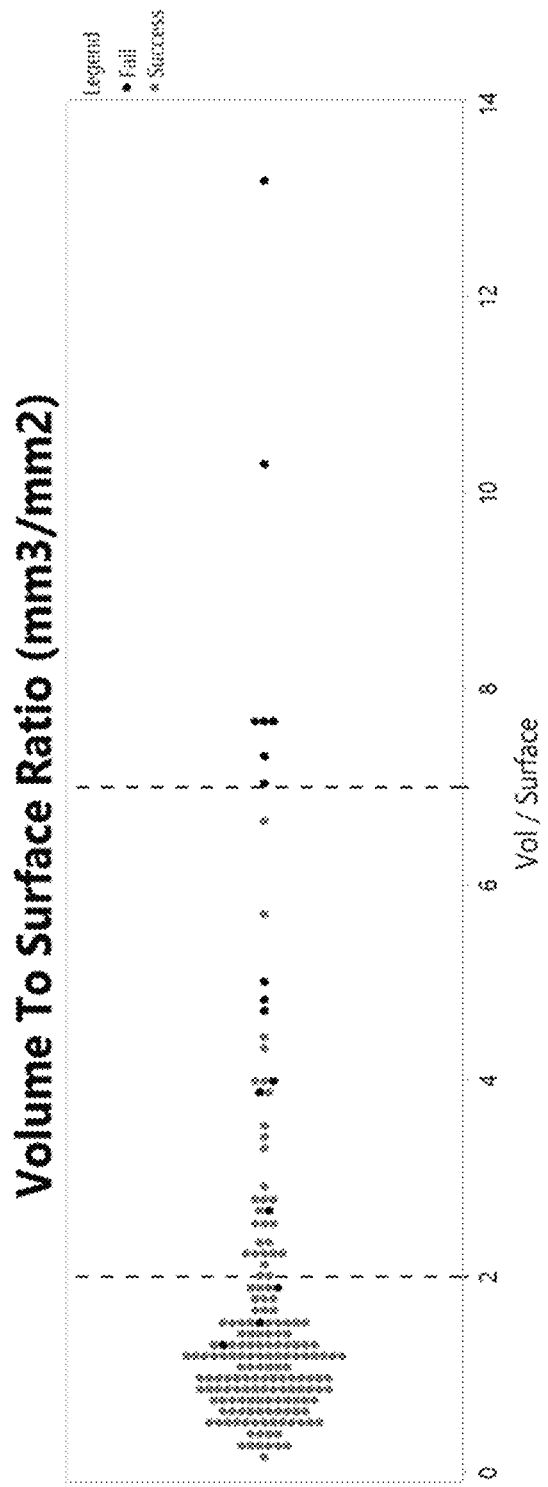
FIG. 4 is a chart showing defective and non-defective parts according to volume to surface area ratio.

FIG. 4 illustrates results of an experiment in which 170 objects were printed from the first material discussed above, organised by increasing volume to surface area ratio. As the surface to volume ratio of the objects increases, the likelihood that the object displays the defect in which a portion of the object, such as an edge, expands upwards also increases. Accordingly, the volume to surface area of the printed object is indicative of the likely presence of the defect. All printed objects with a volume to surface area ratio over 7 were found to be defective.

Figure 5:
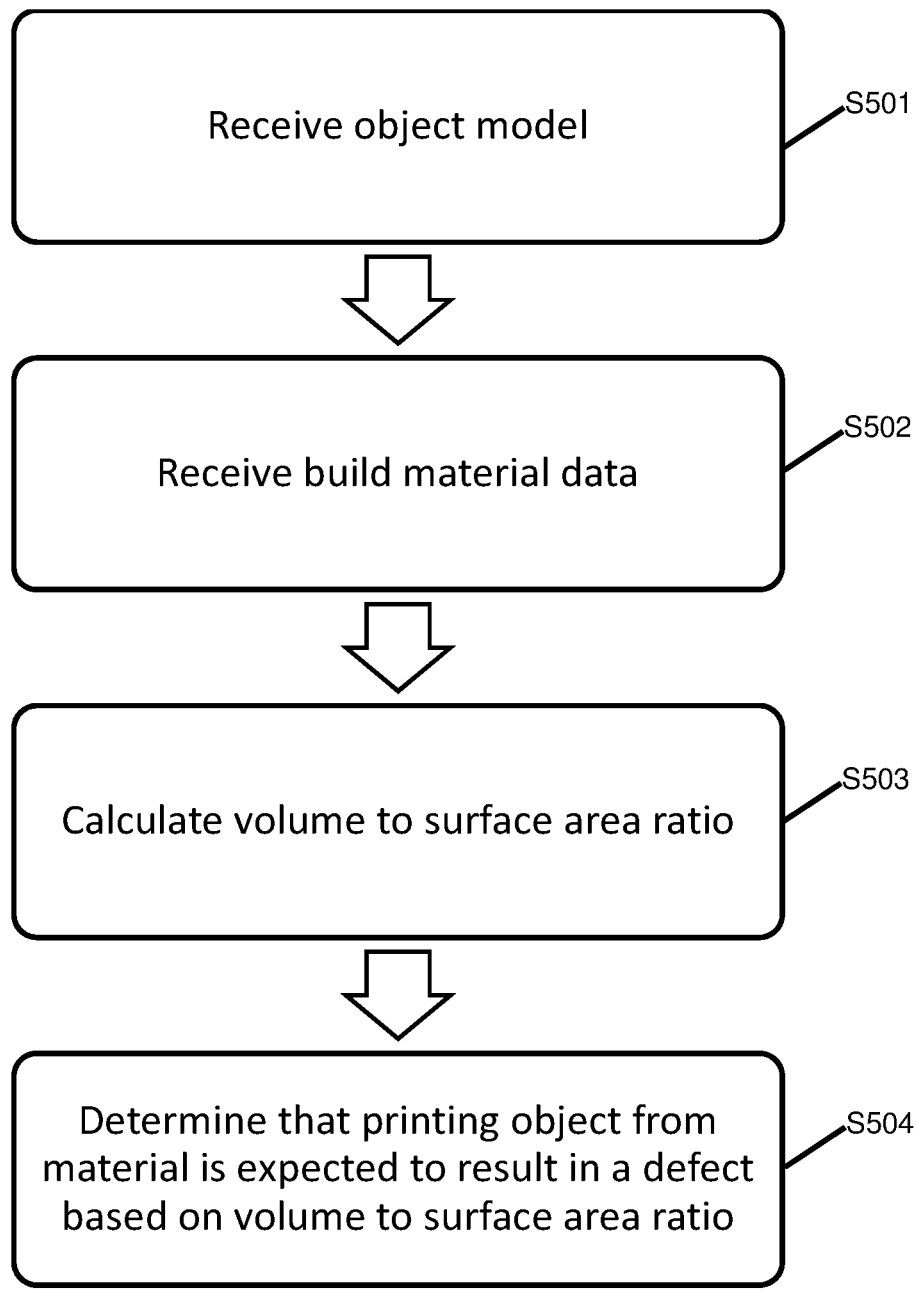
FIG. 5 is a flowchart of an example method of determining that printing a 3D object from a build material will result in a defect.

FIG. 5 illustrates an example method of determining that printing an object is likely to cause a defect in the object. In block S501, object model data is received, representing a 3D object to be printed by a 3D printer such as the 3D printer 100. The object model may be encoded in any suitable file format. For example, the object model may comprise a 3MF file. In other examples, the model may comprise an STL file.

In block S502, build material data is received. The build material data indicates a selected build material to be used for printing the 3D object. In some examples, the method includes receiving user input selecting the build material data. For example, a user may input a selection of the build material via a suitable user interface, such as selecting it from a list or drop-down box. In other examples, the build material data may be based on metadata included with the object model. In further examples, the build material data may be received from a 3D printer 100 which may store build material data in a memory indicating a build material stored in the 3D printer 100.

In some examples, the build material data may be data indicating a particular product, such as Ultrasint® PP. In other examples, the build material data may indicate a particular substance comprised in the build material, such as polypropylene.

In some examples, the method is terminated if the selected build material is not a build material known to exhibit the characteristics discussed above. That is to say, determination of the volume to surface area of the object model may be in response to a selection of a relevant build material. This may be ascertained by reference to stored data indicating which build materials exhibit the characteristics. For example, determination of the volume to surface area of the object model may be in response to a selection of a build material that has a shrinkage at crystallisation of over 1.5% at a cooling rate of under 5° C. per minute.

In block S503, the volume to surface area ratio of the object is determined.

In some examples, metadata accompanying the object comprises one or both of the volume or the surface area. Accordingly, the volume or surface area may be extracted from the metadata.

In other examples, the object model is processed to calculate the surface area or volume. For example, the 3D object model may comprise a plurality of vertices. The vertices form a plurality of polygons, for example triangles, which define the shape of the 3D object. The object model may therefore form a polygonal mesh, for example a triangular mesh. By determining the surface area of each polygon in the mesh, the surface area of the model may be derived. Similarly, the volume may be calculated from the mesh, by using one of a number of suitable methods for volume calculation, for example as widely available in computer aided design packages.

In block S504, a determination is made as to whether printing the object model from the selected material will result in a defect, based on the calculated ratio. For example, the ratio may be compared to a predetermined threshold ratio value. If the ratio exceeds the threshold value, it is determined that printing the object model from the selected material will result in a defect.

In some examples, the predetermined ratio is in a range from $1.5$ $mm^3/mm^2$ to $8$ $mm^3/mm^2$. The predetermined ratio may be in a range from $1.5$ $mm^3/mm^2$ to $7$ $mm^3/mm^2$. The predetermined ratio may be in a range from $1.75$ $mm^3/mm^2$ to $6$ $mm^3/mm^2$. The predetermined ratio may be in a range from $2$ $mm^3/mm^2$ to $5$ $mm^3/mm^2$, or from $2$ $mm^3/mm^2$ to $4$ $mm^3/mm^2$, or from $2$ $mm^3/mm^2$ to $3$ $mm^3/mm^2$. The predetermined ratio may be $2$ $mm^3/mm^2$.

The threshold value may be associated with a build material. Accordingly, different build materials may have different thresholds. The thresholds discussed above may be in respect of build material comprising polypropylene, such as Ultrasint™ PP.

In response to determining that printing the object model will result in a defect, the method may include not printing the object model. As discussed hereinbelow, the method may be executed by the 3D printer 100, in which case the print control unit 140 may not cause the other elements of the 3D printer 100 to generate the object. As also discussed hereinbelow, the method may be executed by a pre-processing apparatus connected to the printer 100 by a network, in which case the pre-processing apparatus may not send the object model to the printer 100 for printing.

In response to determining that printing that the object model will not result in a defect, the method may include causing the object model to be printed. For example, if the method is executed by the 3D printer 100, the print control unit 140 may control the 3D printer 100 to generate the object. If the method is executed by the pre-processing apparatus, the pre-processing apparatus may send the object model to the 3D printer 100 to be printed.

Figure 6:
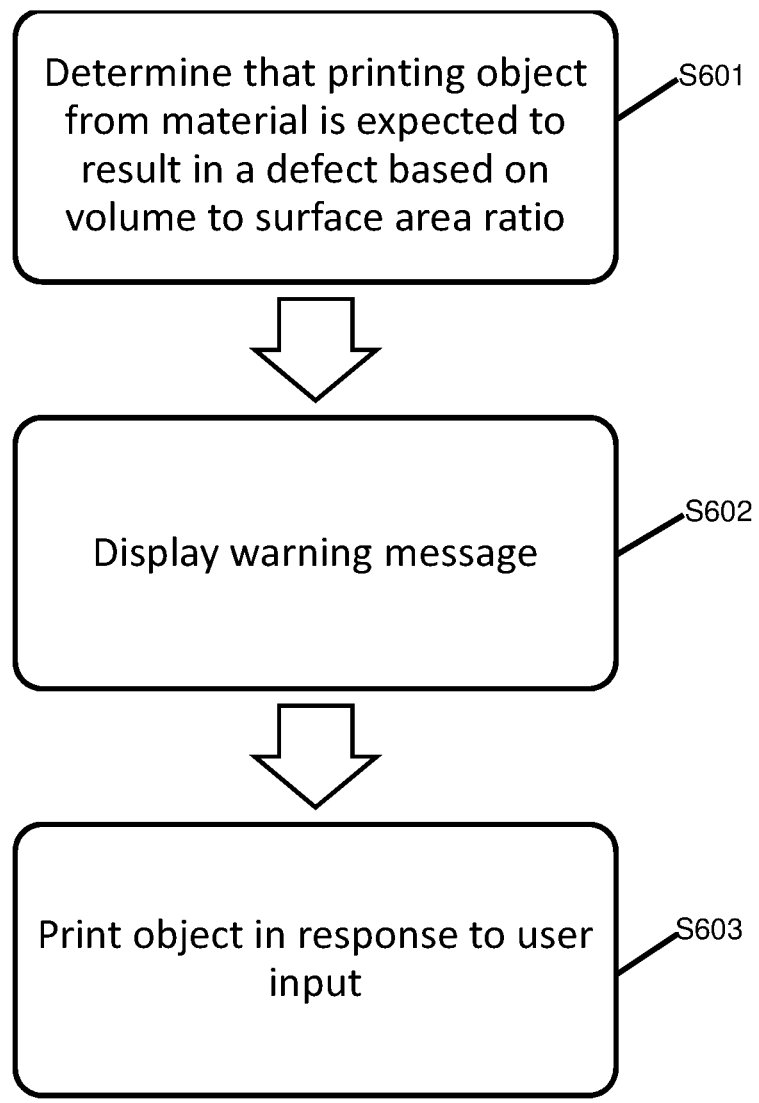
FIG. 6 is a flowchart of an example method of determining that printing a 3D object from a build material will result in a defect.

FIG. 6 shows an example method. In block S601, it is determined that printing the object will result in a defect, for example according to the method discussed above with reference to FIG. 5. In block S602, a warning message is displayed on a user interface, indicating that the printing the object will result in a defect. In block S603, in response to receiving user input indicating the object should be printed, the method includes causing the object to be printed. Accordingly, in the example of FIG. 6, the user is warned of the defective nature of the object, but still has the option to allow printing.

Figure 7:
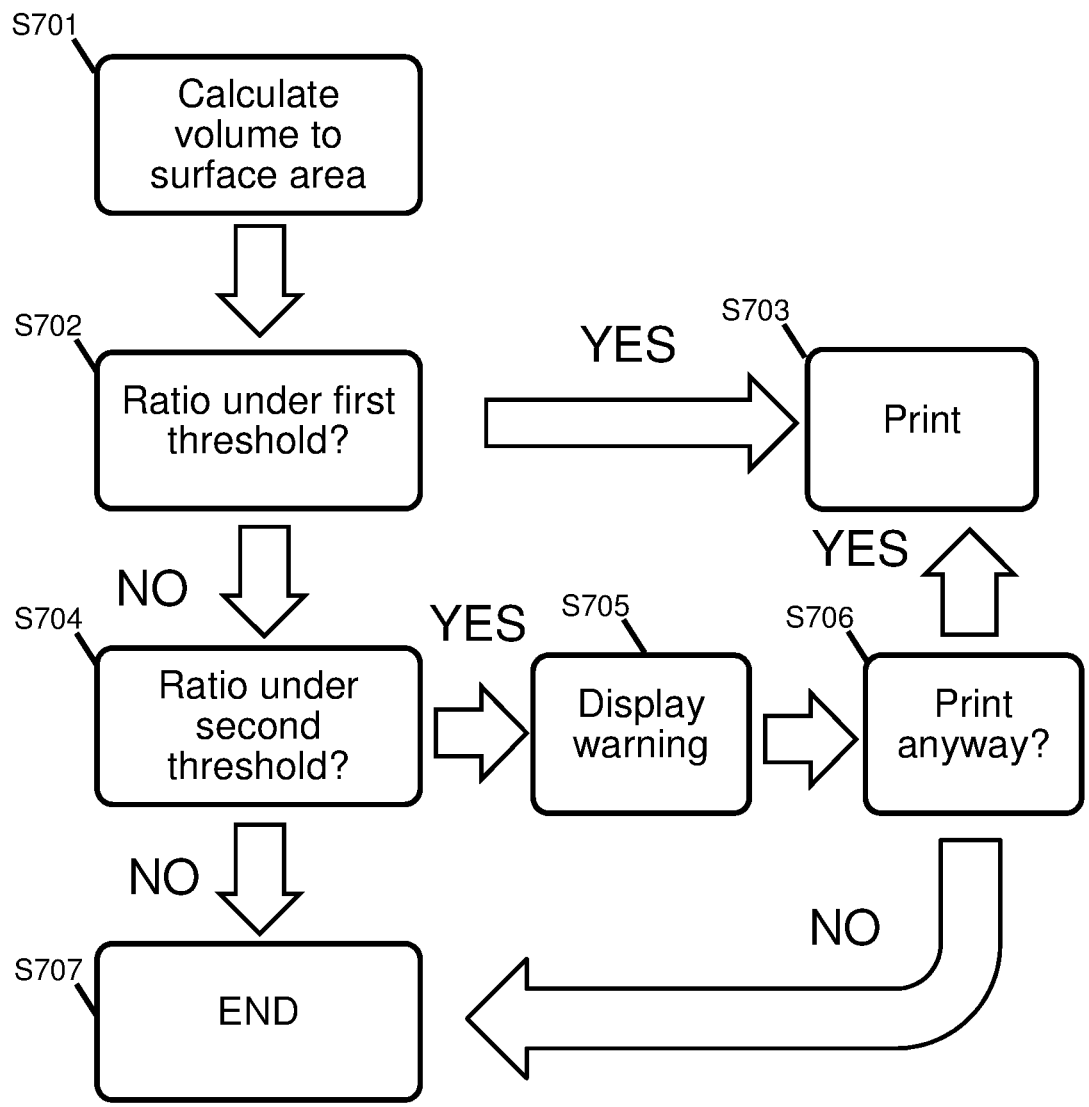
FIG. 7 is a flowchart of an example method of determining that print a 3D object from a build material will result in a defecting.

FIG. 7 shows an example method. According to the method of FIG. 7, two thresholds may be defined. The first threshold may be a threshold below which the object can be printed without defect, with a high degree of confidence. The second threshold may be a threshold below which there is some risk of a defect, but the risk is sufficiently low to merit warning the user rather than preventing printing.

In block S701, the volume to surface area ratio of the object model is calculated. This may be accomplished in the same manner as discussed in respect of block S503 of FIG. 5.

In block S702, it is determined whether the ratio is under the first threshold. If the ratio is under the first threshold, the object is sent to the printer 100 or printed by the printer 100 in block S703.

If the ratio is over the first threshold, it is determined whether the ratio is under the second threshold in block S704. If the ratio is under the second threshold, a warning message may be displayed to the user in block S705. In response to the receipt of user input indicating the object should be printed in block S706, the method includes causing the object to be printed in block S703.

If the user input received in response to the warning message in block S706 indicates that the object should not be printed, the method ends without the object being printed in block S707.

If the ratio is over the second threshold, the method ends without the object being printed in block S707.

Example values of the first threshold may be as discussed above in respect of FIG. 5. Example values of the second threshold may be in a range from $3$ $mm^3/mm^2$ to $10$ $mm^3/mm^2$. The second threshold may be in a range from $4$ $mm^3/mm^2$ to $9$ $mm^3/mm^2$. The second threshold may be in a range from $5$ $mm^3/mm^2$ to $8$ $mm^3/mm^2$. The second threshold may be in a range from $6$ $mm^3/mm^2$ to $7$ $mm^3/mm^2$. The second threshold may be $7$ $mm^3/mm^2$.

The second threshold also may be associated with a build material. Accordingly, different build materials may have different second thresholds. The second thresholds discussed above may be in respect of build material comprising polypropylene, such as Ultrasint™ PP.

Figure 8:
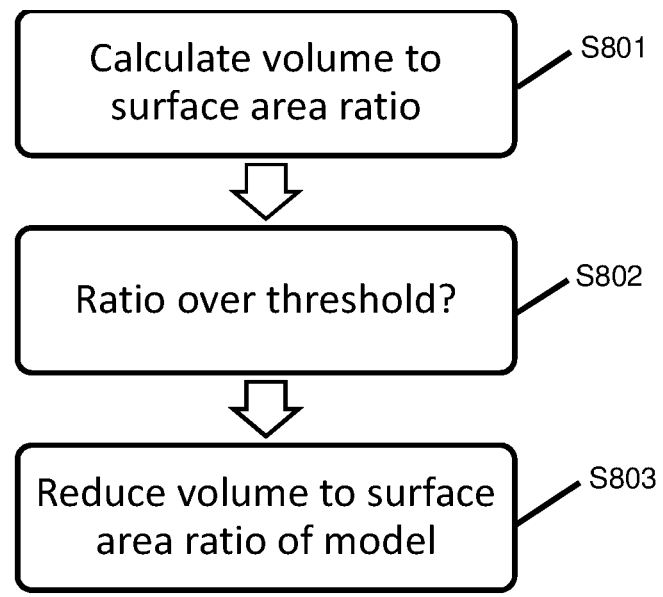
FIG. 8 is a flowchart of an example method of determining that print a 3D object from a build material will result in a defecting.

FIG. 8 shows an example method. In block S801, the volume to surface area ratio of the object model is calculated. In block S802, it is determined whether the ratio is over a threshold.

In block S803, if the ratio is over the threshold, the object model may be processed to reduce the volume to surface area ratio thereof. For example, the model may be processed to include a cavity in the interior thereof. For example, the model may be hollowed out by being processed to include walls of a predetermined thickness around an internal cavity. The processed model may then act as the input to any of the methods described herein.

The threshold of FIG. 8 may be either of the first or second thresholds discussed with respect to FIG. 7. Accordingly, objects that are highly likely to be defective or which bear some risk of defect may be processed to reduce the risk of a defect.

Figure 9:
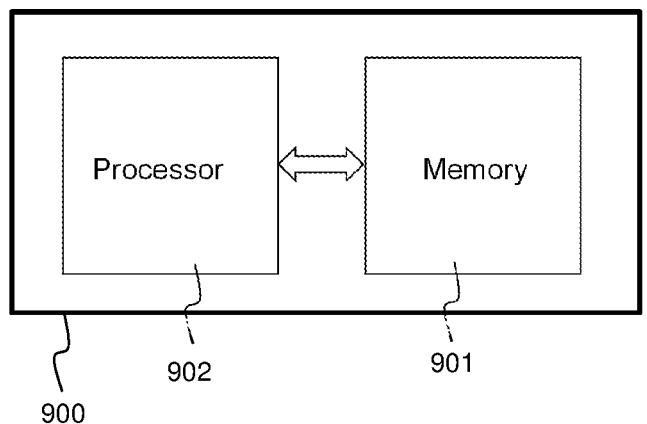
FIG. 9 is a schematic block diagram of an example apparatus.

FIG. 9 shows an example apparatus 900. The apparatus 900 comprises a memory 901 and a processor 902.

The memory 901 is to store an object model, for example the object model 200 discussed above. The memory 901 is further to store build material data indicated a selected build material from which to form the 3D object.

The memory 901 may comprise any suitable storage for storing, transiently or permanently, any information useful for the operation of the apparatus 500. The memory 501 may comprise random access memory, read only memory, flash storage, disk drives and any other type of suitable storage media.

The processor 902 is to determine if the 3D object can be generated from the selected build material without causing upward expansion of the 3D object. For example, the processor 502 is to determine that a volume to surface area ratio of the stored object model is lower than a predetermined ratio.

The apparatus 900 may be to execute any of the methods described herein.

In one example, the apparatus 900 is a computing device, e.g. a personal computer, tablet computer or server computer. Accordingly, the apparatus 900 may be a pre-processing apparatus, to process the object model before it may be subsequently transmitted to a 3D printer for printing. In such an example, the apparatus 900 may comprise suitable data transmission elements, such as a network interface, to transmit the transformed model to the 3D printer over a network.

In a further example, the apparatus 900 is a 3D printer, for example 3D printer 100. The print control unit 140 may comprise the processor 902 and memory 901.

Figure 10:
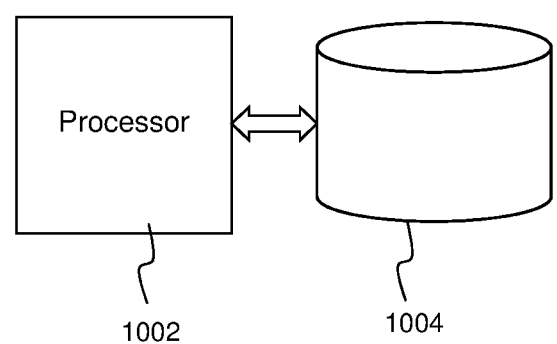
FIG. 10 is a schematic block diagram of an example computer-readable storage medium.

FIG. 10 shows an example non-transitory machine-readable storage medium 1004 encoded with instructions executable by a processor 1002.

The storage medium 1004 may comprise instructions to calculate a volume to surface area ratio of a three-dimensional, 3D, object model, the 3D object model for use in generating a 3D object in a build chamber from a build material. The storage medium 1004 may comprise instructions to determine whether generation of the 3D object from the build material will result in upward expansion of the 3D object during generation, based on the calculated volume to surface area ratio. The storage medium 1004 may comprise instructions to carry out any of the methods discussed herein.

The examples described herein permit the identification of 3D object models that result in a defect when printed, which may cause a collision between the printed object and moving parts of the 3D printer. Furthermore, some of the examples described herein prevent such objects from being printed, or allow a user to be warned of the defect. Some of the examples involve modifying the object model to prevent the defect.

The invention claimed is:

1. A method comprising:
   receiving, by a processor of a device, an object model describing a geometry of a three-dimensional (3D) object for printing by a 3D printer;
   receiving, by the processor, build material data indicating a selected build material to be used in printing the 3D object by the 3D printer;
   calculating, by the processor, a volume to surface area ratio of the object model;
   in response to the volume to surface area ratio of the object model being greater than a first predetermined threshold value for the selected build material, and prior to printing of the 3D object being initiated, determining, by the processor, that printing of the 3D object by the 3D printer from the selected build material in accordance with the object model as received is expected to result in a defect in the 3D object.

2. The method of claim 1, further comprising:
   in response to the volume to surface area being greater than the first predetermined threshold value, not initiating printing the 3D object with the 3D printer in accordance with the object model as received.

3. The method of claim 1, further comprising:
   in response to the volume to surface area being greater than the first predetermined threshold value, displaying, by the processor, a warning message on a user interface indicating that printing of the 3D object by the 3D printer from the selected build material in accordance with the object model as received is expected to result in a defect in the 3D object.

4. The method of claim 1, wherein the first predetermined threshold value has a value within a range between 1.5 $mm^3/mm^2$ and 8 $mm^3/mm^2$, the range including 1.5 $mm^3/mm^2$ and 8 $mm^3/mm^2$.

5. The method of claim 1, further comprising:
   in response to the volume to surface area being greater than a second predetermined threshold value and less than or equal to the first predetermined threshold value, displaying, by the processor, a warning message on a user interface indicating the 3D object is at risk of failure.

6. The method of claim 1, further comprising:
   In response to the volume to surface area ratio being greater than the first predetermined threshold, and prior to printing of the 3D object being initiated, modifying the object model to reduce the volume to surface area ratio.

7. The method of claim 1, further comprising:
   calculating, by the processor, the volume to surface area ratio in response to receiving build material data indicating the selected build material has a shrinkage at crystallization of over 1.5% at a cooling rate of under 5° C. per minute.

8. An apparatus comprising:
   a memory to store an object model describing a geometry of a three-dimensional (3D) object and build material data indicating a selected build material from which to form the 3D object; and
   a processor to determine, prior to generation of the 3D object being initiated, whether the 3D object can be generated from the selected build material in accordance with the object model as received without causing upward expansion of the 3D object, by determining a volume to surface area ratio of the object model is less than a predetermined ratio.

9. The apparatus of claim 8, wherein the apparatus is a 3D printing apparatus configured to generate the 3D object based on the object model in accordance with the object model as received, in response to the processor determining that the 3D object can be generated in accordance with the object model as received without causing upward expansion of the 3D object.

10. The apparatus of claim 8, wherein the processor is further to transmit the 3D object model to a 3D printer for printing in accordance with the object model as received, in response to the processor determining that the 3D object model can be generated in accordance with the object model as received without causing upward expansion of the 3D object.

11. The apparatus of claim 8, wherein the selected build material comprises polypropylene.

12. The method of claim 1, wherein the predetermined ratio has a value within a range between 1.5 $mm^3/mm^2$ and 8 $mm^3/mm^2$, the range including 1.5 $mm^3/mm^2$ and 8 $mm^3/mm^2$.

13. A non-transitory machine-readable storage medium storing instructions executable by a processor to perform processing comprising:
   calculating a volume to surface area ratio of a three-dimensional (3D) object model, the 3D object model describing a 3D object for printing the 3D object in a build chamber from a build material;
   determining, prior to generation of the 3D object being initiated, whether generation of the 3D object from the build material in accordance with the object model as received is expected to result in upward expansion of the 3D object during generation, in a case where the volume to surface area ratio of the 3D object model is less than a predetermined ratio.

14. The non-transitory machine-readable storage medium of claim 13, wherein the processing further comprises:
modifying the 3D object model to include a cavity, in response to determining that generation of the 3D object in accordance with the object model as received is expected to result in upward expansion of the 3D object during generation.

15. The non-transitory machine-readable storage medium of claim 13, wherein the processing further comprises:
initiating generation of the 3D object in the build chamber from the build material, in response to determining that generation of the 3D object in accordance with the object model as received is not expected to result in upward expansion of the 3D object during generation.

16. The method of claim 1, wherein the first threshold predetermined threshold value has a value within a range between 2.0 mm$^3$/mm$^2$ and 7 mm$^3$/mm$^2$, the range including 2 mm$^3$/mm$^2$ and 7 mm$^3$/mm$^2$.

17. The method of claim 2, further comprising:
in response to the volume to surface area being less than the first predetermined threshold value, initiating printing of the printing 3D object with the 3D printer in accordance with the object model as received.

18. The method of claim 1, further comprising:
in response to the volume to surface area being less than a second predetermined threshold value that is less than the first predetermined threshold value, initiating printing of the 3D object with the 3D printer in accordance with the object model as received.

19. The method of claim 18, further comprising:
in response to the volume to surface area being greater than the second predetermined threshold value and less than the first predetermined threshold value, not initiating printing of the 3D object with the 3D printer according to the object model with or without the object model having first been modified to reduce the volume to surface area ratio.

20. The method of claim 19, further comprising:
in response to the volume to surface area being greater than the first predetermined threshold value, not initiating printing of the 3D object with the 3D printer according to the object model without the object model having first been modified to reduce the volume to surface area ratio.

* * * * *